April 24, 1928. 1,667,611
E. S. THOMPSON
GRAIN SEPARATOR
Filed June 20, 1927 2 Sheets-Sheet 1
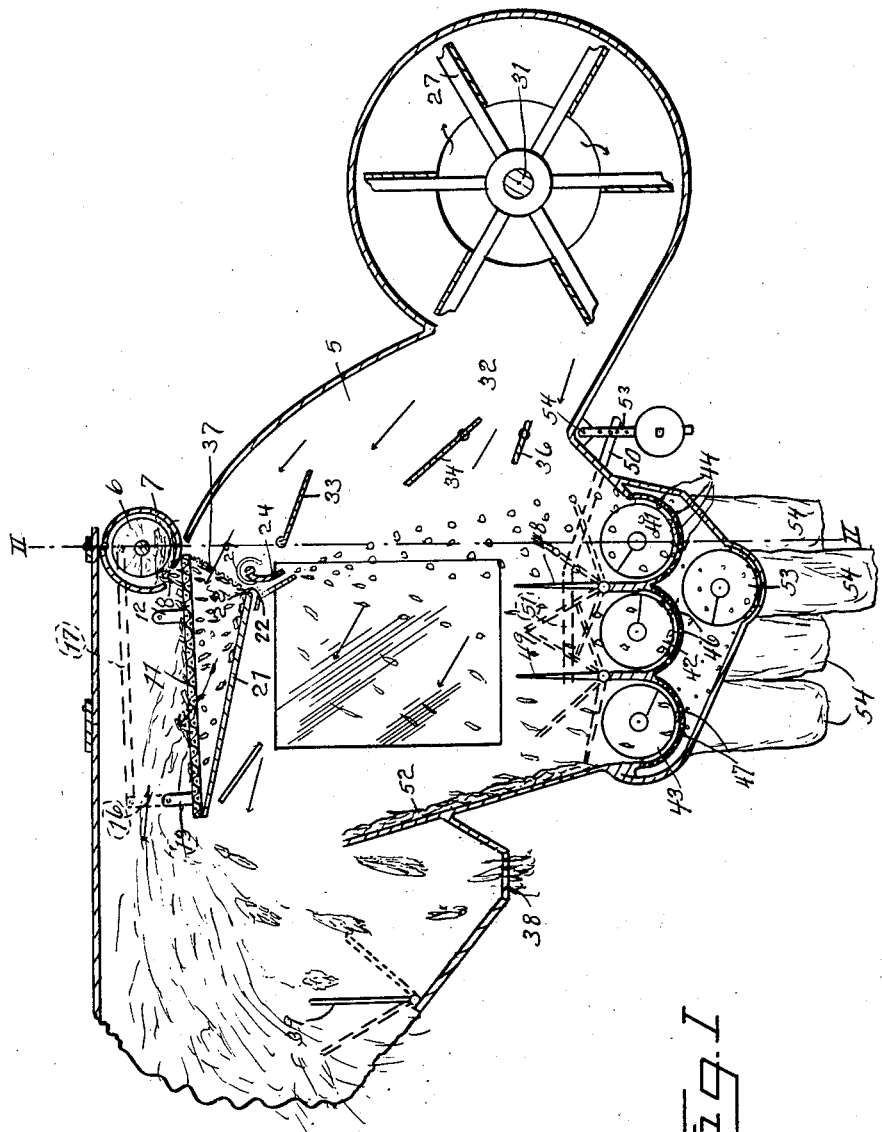
Fig. I
INVENTOR.
E. S. THOMPSON
BY
ATTORNEY.

April 24, 1928.
E. S. THOMPSON
GRAIN SEPARATOR
Filed June 20, 1927
1,667,611
2 Sheets-Sheet 2
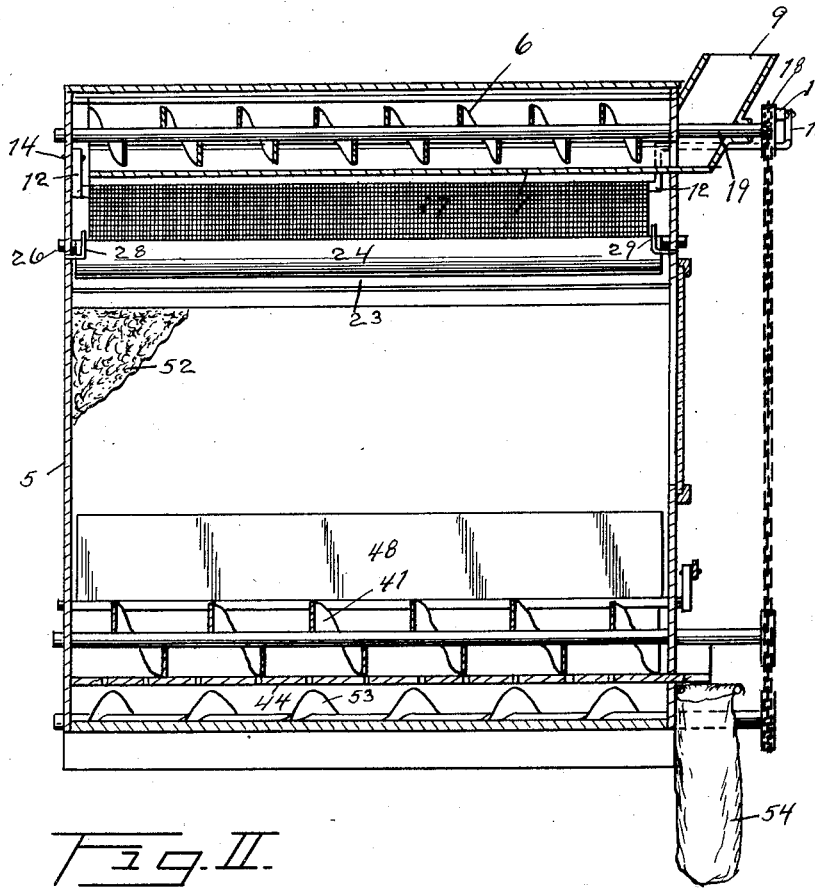
Fig. II.
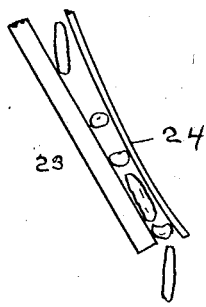
Fig. III.
INVENTOR.
E. S. THOMPSON
BY Victor J. Evans
ATTORNEY.

Patented Apr. 24, 1928.

1,667,611

UNITED STATES PATENT OFFICE.

ERNEST S. THOMPSON, OF PORTERVILLE, CALIFORNIA.

GRAIN SEPARATOR.

Application filed June 20, 1927. Serial No. 200,247.

This invention relates to improvements in grain separators.

The principal object of this invention is to produce a device wherein the grain delivered from a threshing machine may be graded, and cleaned so as to remove objectionable seeds and other foreign particles.

Another object of my invention is to produce a device which may be installed upon a traveling threshing machine or upon a stationary thresher or a device which may be employed as a unit by itself.

A further object is to produce a device of this character which is economical to manufacture.

A further object is to provide means whereby grains of various characters may be separated irrespective of their size or weight.

A still further object is to provide means whereby the separating action may be readily controlled to conform to various changes in grading conditions.

Other objects and advantages will be apparent during the course of the following description.

In the accompanying drawings forming a part of this specification, and in which like numerals are employed to designate like parts throughout the same, Figure I is a vertical cross-section of my grader, Figure II is a vertical cross-section of my grader taken on the line 2—2 of Figure I and Figure III is a diagrammatic view on an enlarged scale showing the manner in which the grain passes through the distributing traps.

In the separating of grain, it is a well known fact that various grains have different shapes consequently, they will present to a draft of air, various surfaces and due to these shapes they will fall through a draft of air, which will automatically separate the lighter grains travelling with the draft of air, those that are heavy falling more directly and those with a large amount of surface falling still further with the draft of air before reaching their destination.

In the accompanying drawings wherein for the purpose of illustration is shown a preferred embodiment of my invention, the numeral 5 designates the housing of my device as a whole. Near the upper extremity of the housing I provide a screw conveyor 6 mounted within a trough 7. A slot 8 in the trough permits grain placed in the hopper 9 to be discharged from the trough on a shaking screen 11. This screen is preferably carried on links 12 and 13 which are pivoted to the housing as at 14.

A crank 16 is connected by a link 17 to a pin carried on the pulley wheel 18, which pulley wheel is moved by the conveyor shaft 19. The result is that as the conveyor shaft 19 is rotated the shaking screen 11 will be given a reciprocating action.

Grain falling upon the screen 11 will pass therethrough leaving foreign matter such as sticks, leaves and the like upon the top of the screen to be blown away by the air draft as will be later described.

The grain passing through the screen 11 will fall upon an inclined table 21 and will be discharged through an opening 22 into a grain trap consisting of a board 23 and a movable plate 24. This movable plate 24 is hinged as at 26 and is provided with springs 28 and 29 at its opposite ends. These springs are of light construction and are only sufficient to maintain a limited pressure upon the plate 24. Consequently, grain passing through the opening 22 will fall between the board 23 and the plate 24, as indicated in Figure III. As a result all grain having an elongated construction will discharge broadside about the air draft set up by the fan 27. This fan is mounted upon a shaft 31 which is rotated by a suitable source of power.

The fan delivers a current of air which travels through the throat 32 and comes into contact with control boards 33, 34 and 36. By manipulating these control boards, the flow of air from the throat 32 may be directed in any desired manner, so as to cause a portion of the air to pass upwardly through the screen 37 thence through the screen 11 which will remove any leaves and other foreign substances from the screen and discharge them therefrom. The unthrashed heads fall and are discharged through the opening 38 to be rethrashed.

The control board 39 serves to separate the chaff from the material it is desired to save and pass out of the opening 38. The control boards 33 and 34 also serve to concentrate a draft at the grain trap, while a board 36 serves to control the amount of draft toward the lower portion of the grain flight.

Positioned in the lower portion of the machine, is a plurality of screw conveyors 41, 42 and 43 each of which is positioned in a perforated trough as shown at 44, 46 and 47, respectively.

Division boards 48 and 49 are pivoted between the troughs and are connected together by a link 51 to which is pivoted a link 50 which is in turn pivoted to a pendulum 53 hinged to the frame as at 54. The result of this construction is that as the grains fall from the grain trap, the heavy grains will fall onto the screw conveyor 41 while the lighter grains will fall upon the screw conveyor 42 and the lightest grains will be carried over onto the conveyor 43. A sheep skin covering is shown at 52, the purpose of which is to prevent any grains from rebounding which may hit against this surface. They will therefore come into contact with the sheep skin and merely slide down onto the screw conveyor 43.

The purpose of having the troughs 44, 46 and 47 perforated is to permit any small seeds, such as mustard seeds to pass therethrough and to be carried away by a screw conveyor 53.

These conveyors are adapted to discharge their grain into bags 54.

It will thus be seen that with my device, it is possible to introduce grain into the hopper 9, convey the same through the trough 7 to a screen 11 where the large foreign particles are blown away. After the grain is passed there-through the grain is later discharged into a grain trap which causes the grain to pass in such a manner that it is impossible for any of the long grains to fall end-wise toward the air current with the result that the greatest possible surface is presented to the air resulting in a lateral movement of the current, which movement accomplishes a separating action. The amount of separation is controlled by the amount of surface presented to the air.

I have also provided means for controlling the air current which is merely a light breeze, in counter-distinction to the heavy draft usually employed. By adjusting the division boards 48 and 49 to any of their dotted line positions, I am able to effect a uniform separation.

The purpose of the pendulum 53 is to control the position of the division boards when the device is mounted upon a travelling threshing machine, which is apt to encounter inclinations in the ground surface, and consequently the pendulum will maintain the division boards in the proper position.

It is to be understood that the form of my invention, herewith shown and described is to be taken as a preferred example of the same and that various changes relative to the shape, size, material, arrangement of parts may be resorted to without departing from the spirit of the invention, or the scope of the subjoined claims.

Having thus described my invention, I claim:—

1. In a grain separator of the character described, a shaking screen adapted to have grain placed thereon, an inclined member positioned beneath said screen and adapted to receive the grain passing through said screen, a trap positioned at the lower extremity of said board, said trap comprising a stationary board and a movable plate resiliently held in spaced relation to said board, means for producing an air current through said screen and beneath said trap, for the purpose specified.

2. In a grain separator of the character described, a shaking screen adapted to have grain placed thereon, an inclined member positioned beneath said screen and adapted to receive the grain passing through said screen, a trap positioned at the lower extremity of said board, said trap comprising a stationary board and a movable plate resiliently held in spaced relation to said board, means for producing an air current through said screen and beneath said trap, a plurality of control boards positioned within said air draft so as to direct said air draft, and a plurality of troughs for receiving grain discharged from said grain trap.

In testimony whereof I affix my signature.

ERNEST S. THOMPSON.